(12) United States Patent
Bawa et al.

(10) Patent No.: US 11,934,817 B2
(45) Date of Patent: Mar. 19, 2024

(54) SYSTEMS AND METHODS FOR DEPLOYING FEDERATED INFRASTRUCTURE AS CODE

(71) Applicant: JPMORGAN CHASE BANK, N.A., New York, NY (US)

(72) Inventors: Manuj Bawa, Clarksburg, MD (US); John S Combs, Fallston, MD (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 221 days.

(21) Appl. No.: 17/510,122

(22) Filed: Oct. 25, 2021

(65) Prior Publication Data
US 2023/0128753 A1    Apr. 27, 2023

(51) Int. Cl.
*G06F 9/44* (2018.01)
*G06F 8/20* (2018.01)
(Continued)

(52) U.S. Cl.
CPC .................. *G06F 8/60* (2013.01); *G06F 8/20* (2013.01); *G06F 8/71* (2013.01)

(58) Field of Classification Search
CPC ................. G06F 8/60; G06F 8/20; G06F 8/71
See application file for complete search history.

(56) References Cited

U.S. PATENT DOCUMENTS 9,535,663 B2 * 1/2017 Yaseen ...................... G06F 8/10
10,318,285 B1 * 6/2019 Jodoin ................ G06F 11/3612
(Continued)

FOREIGN PATENT DOCUMENTS

| WO | WO-2015065382 A1 * | 5/2015 | ........... G06F 17/509 |
| WO | 2019113216 | 6/2019 | |
| WO | WO-2019238136 A1 * | 12/2019 | ............... G06F 8/20 |

OTHER PUBLICATIONS

Leila Abidi, A Deployment System for highly Heterogeneous and Dynamic Environments, 2017, pp. 627-634. https://ieeexplore.ieee.org/stamp/stamp.jsp?tp=&arnumber=8035137 (Year: 2017).*

(Continued)

*Primary Examiner* — Mongbao Nguyen
(74) *Attorney, Agent, or Firm* — GREENBERG TRAURIG LLP

(57) ABSTRACT

A method for deploying federated infrastructure as code may include an infrastructure seeding engine: receiving a plurality of extensible application patterns; publishing the extensible application patterns to an application pattern catalog; receiving an instantiate request comprising a selection of one of the plurality of extensible application patterns and a blueprint, wherein the blueprint identifies a deployment technology; generating metadata for the selected extensible application pattern; generating a configuration for the selected extensible application pattern; creating execution isolations for deployments based on the metadata; applying security policies to the selected extensible application pattern; generating source code for the selected extensible application pattern; creating and linking the source code for the selected extensible application pattern to a continuous integration/continuous development pipelines; initializing the source code to an infrastructure; and deploying an application artifacts infrastructure, wherein the deployment achieves an immutable infrastructure.

13 Claims, 2 Drawing Sheets

(51) Int. Cl.
*G06F 8/60* (2018.01)
*G06F 8/71* (2018.01)
*G06F 9/445* (2018.01)
*G06F 9/455* (2018.01)

(56) References Cited

U.S. PATENT DOCUMENTS

| | | | | |
|---|---|---|---|---|
| 10,466,990 | B1* | 11/2019 | Mccluskey | G06F 8/20 |
| 11,074,091 | B1* | 7/2021 | Nayakbomman | G06F 9/455 |
| 11,080,032 | B1* | 8/2021 | O'Mahony | G06F 9/45533 |
| 11,086,700 | B2* | 8/2021 | Myneni | H04L 63/0263 |
| 11,132,226 | B2* | 9/2021 | Jadhav | G06F 9/5077 |
| 2013/0262626 | A1* | 10/2013 | Bozek | H04W 4/60 |
| | | | | 709/217 |
| 2014/0033268 | A1 | 1/2014 | Julisch et al. | |
| 2015/0277884 | A1* | 10/2015 | Giammaria | G06F 8/36 |
| | | | | 717/120 |
| 2022/0197625 | A1* | 6/2022 | Franchitti | G06F 16/9538 |

OTHER PUBLICATIONS

Anirban Bhattacharjee, CloudCAMP: Automating Cloud Services Deployment & Management, 2019, pp. 1-12. chrome-extension://efaidnbmnnnibpcajpcglclefindmkaj/https://arxiv.org/pdf/1904.02184.pdf (Year: 2019).*
International Search Report, dated Jan. 17, 2022, from corresponding International Application No. PCT/US2021/056505.
Written Opinion of the International Searching Authority, dated Jan. 17, 2022, from corresponding International Application No. PCT/US2021/056505.

* cited by examiner

SYSTEMS AND METHODS FOR DEPLOYING FEDERATED INFRASTRUCTURE AS CODE

RELATED APPLICATIONS

This application claims priority to, and the benefit of, U.S. Provisional Patent Application Ser. No. 63/104,775, filed Oct. 23, 2020, the disclosure of which is hereby incorporated, by reference, in its entirety.

BACKGROUND OF THE INVENTION

1. Field of the Invention

Embodiments relate generally to systems and methods for deploying federated infrastructure as code.

2. Description of the Related Art

Infrastructure as Code (IaC) has recently emerged as a hot trend. While there are commercial products in this space, they do not address internal governance needs of an organization, such as controls on who is authorized to deploy what features, who can access those features, the general inventory of the hardware infrastructure, etc. Further, there may be problems with scaling to a large organization as variations in each type of hardware, and the specifications for various application patterns.

SUMMARY OF THE INVENTION

Systems and methods for deploying federated infrastructure as code are disclosed. According to an embodiment, a method for deploying federated infrastructure as code may include: (1) receiving, by an infrastructure seeding engine executed by a computer processor, a plurality of extensible application patterns; (2) publishing, by the infrastructure seeding engine, the extensible application patterns to an application pattern catalog; (3) receiving, by the infrastructure seeding engine, an instantiate request comprising a selection of one of the plurality of extensible application patterns and a blueprint, wherein the blueprint identifies a deployment technology; (4) generating, by the infrastructure seeding engine, metadata for the selected extensible application pattern; (5) generating, by the infrastructure seeding engine, a configuration for the selected extensible application pattern; (6) creating, by the infrastructure seeding engine, execution isolations for deployments based on the metadata; (7) applying, by the infrastructure seeding engine, security policies to the selected extensible application pattern; (8) generating, by the infrastructure seeding engine, source code for the selected extensible application pattern; (9) creating and linking, by the infrastructure seeding engine, the source code for the selected extensible application pattern to a continuous integration/continuous development pipelines; (10) initializing, by the infrastructure seeding engine, the source code to an infrastructure; and (11) deploying, by the infrastructure seeding engine, to an application artifacts infrastructure, wherein the deployment achieves an immutable infrastructure.

In one embodiment, the extensible application patterns may include an operating system extensible application pattern, a platform extensible application pattern, and/or In one embodiment, the metadata may include execution isolation, inheritance between execution isolations, and/or scope of configuration parameters between isolation contexts.

In one embodiment, the metadata may identify a type of application, a geo-location for the application and/or the blueprint, a legal jurisdiction for the application and/or the blueprint, or a data classification check for the application.

In one embodiment, the execution isolations may include a Layer-1 execution scope and a Layer-2 execution scope.

In one embodiment, the Layer-1 execution scope may identify network tables, network routing, network isolations, subnets, VLANs, and/or foundational firewall ports for the selected extensible application pattern.

In one embodiment, the Layer-2 execution scope may include infrastructure code the selected extensible application pattern and/or the blueprint.

In one embodiment, the code for the selected extensible application pattern may be inherited from the published extensible application pattern.

In one embodiment, the method may further include receiving, by the infrastructure seeding engine, approval for the selected extensible application pattern.

According to another embodiment, an electronic device may include a memory storing an infrastructure seeding engine and a computer processor. When executed by the computer processor, the infrastructure seeding engine may cause the computer processor to: receive a plurality of extensible application patterns; publish the extensible application patterns to an application pattern catalog; receive an instantiate request comprising a selection of one of the plurality of extensible application patterns and a blueprint, wherein the blueprint identifies a deployment technology; generate metadata for the selected extensible application pattern; generate a configuration for the selected extensible application pattern; create execution isolations for deployments based on the metadata; apply security policies to the selected extensible application pattern; generate source code for the selected extensible application pattern; create and link the source code for the selected extensible application pattern to a continuous integration/continuous development pipelines; initialize the source code to an infrastructure; and deploy an application artifacts infrastructure, wherein the deployment achieves an immutable infrastructure.

In one embodiment, the extensible application patterns may include an operating system extensible application pattern, a platform extensible application pattern, and/or In one embodiment, the metadata may include execution isolation, inheritance between execution isolations, and/or scope of configuration parameters between isolation contexts.

In one embodiment, the metadata may identify a type of application, a geo-location for the application and/or the blueprint, a legal jurisdiction for the application and/or the blueprint, or a data classification check for the application.

In one embodiment, the execution isolations may include a Layer-1 execution scope and a Layer-2 execution scope.

In one embodiment, the Layer-1 execution scope may identify network tables, network routing, network isolations, subnets, VLANs, and/or foundational firewall ports for the selected extensible application pattern.

In one embodiment, the Layer-2 execution scope may include infrastructure code the selected extensible application pattern and/or the blueprint.

In one embodiment, the code for the selected extensible application pattern may be inherited from the published extensible application pattern.

In one embodiment, the infrastructure seeding engine may also cause the computer processor to receive approval for the selected extensible application pattern.

According to another embodiment, a system may include: a source of a plurality of extensible application patterns; an application pattern catalog storing the plurality of extensible application patterns; a metadata linking store that stores metadata; a configuration store that stores configuration data; a security policy store that stores security policies applicable to the plurality of extensible application patterns; a source code repository that stores source code; a continuous integration/continuous development pipeline; and an infrastructure seeding engine executed by an electronic device that receives a selection of one of the plurality of extensible application patterns and a blueprint, wherein the blueprint identifies a deployment technology, generate metadata for the selected extensible application pattern and stores the metadata in the metadata store; generates a configuration for the selected extensible application pattern and stores the configuration in the configuration store; creates execution isolations for deployments based on the metadata, apply security policies to the selected extensible application pattern from the security policy store; generate source code for the selected extensible application pattern and store the source code in the source code repository, creates and links the source code for the selected extensible application pattern to the continuous integration/continuous development pipeline, initializes the source code to an infrastructure, and deploys an application artifacts infrastructure, wherein the deployment achieves an immutable infrastructure.

In one embodiment, the execution isolations may include a Layer-1 execution scope and a Layer-2 execution scope, the Layer-1 execution scope identifies network tables, network routing, network isolations, subnets, VLANs, and/or foundational firewall ports for the selected extensible application pattern and the Layer-2 execution scope may include infrastructure code the selected extensible application pattern and/or the blueprint. It may further include geo-location-restrictions, redundancy, legal restrictions based on the application attributes (e.g., forced logging or heightened logging), etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
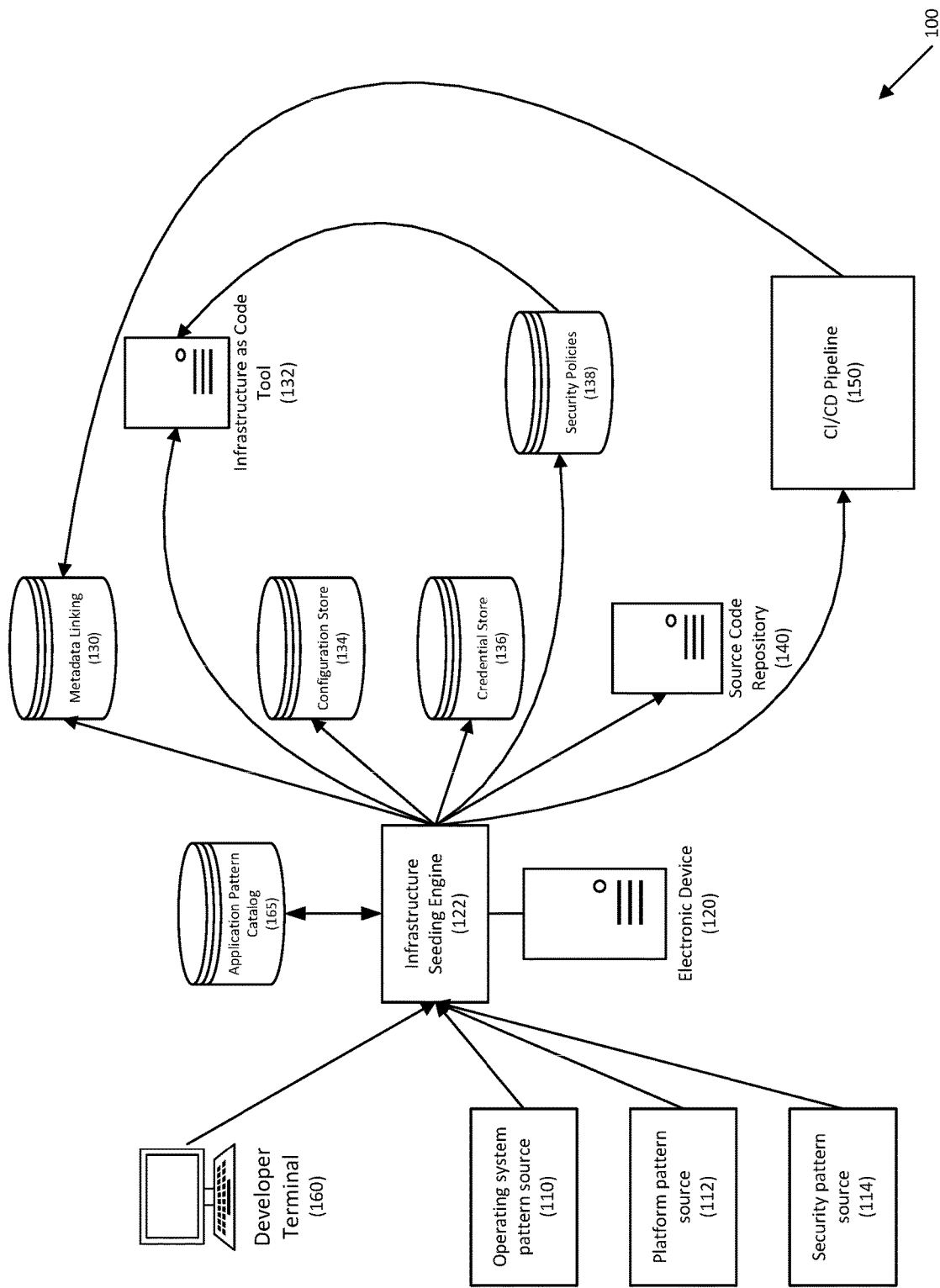
FIG. 1 depicts a system for deploying federated infrastructure as code according to an embodiment.

The disclosures of U.S. Provisional Patent Application Ser. No. 63/081,477, filed Sep. 22, 2020 and U.S. patent application Ser. No. 17/481,581, filed Sep. 22, 202 are hereby incorporated, by reference, in their entireties.

Embodiments relate generally to systems and methods for deploying federated infrastructure as code.

Embodiments may distribute applications on at least some of the following parameters: (1) deployment artifacts; (2) sensitive information; (3) resiliency requirements; and (4) traceability to an application ID and financial requirements. In embodiments, pre-defined "application patterns" or "blueprints" may be curated to meet an organization's controls and governance requirements.

In embodiment, platform teams may extend and work the blueprints per their requirements, Embodiments may provide a three-pronged governance model: (1) platform team(s) to define initial blueprints; (2) control team(s) to define the validation of organization controls and processes; and (3) application teams and contributors that use the patterns or blueprints and may contribute back to enterprise blueprints.

In embodiments, each workspace, artifact and asset may be tracked back to a central inventory for audit and financial tracking.

Embodiments may include the following exemplary components:

A source code repository for maintaining application, infrastructure (infrastructure as code), security and configuration code. The repository for each project may include application code, such as a folder that stores application code that compiles to an artifact (functions, WAR, JAR, EAR) that is deployed on a web/application container. Application teams may have read/write access on this folder and all its child nodes.

Any configuration required for deploying the artifact in environments for example: temporary folders, backup locations, file move locations, initialization for apps can be stored in the "Configuration" folders.

Platform Infrastructure ("Layer-1"): source code for creating platform level cloud infrastructure or anything that should not be edited by application teams. For example, subnet creation requires IP address allocation, route table updates, base security groups that allow default ports, forced logging, routing of logs, credential management for app-to-app authentication, etc.

This repository has read/write access for cloud platform team only. The source code may be checked into this stream either by templating process triggered automatically or manually by one of the cloud platform teams.

Layer-1 may include a configuration folder that stores configuration information required by platform infrastructure as code. Sensitive information, such as IP Addresses for subnets, number of subnets, tags for subnets (e.g., web, app, data) etc. may be stored here. Configuration information may be pulled as part of the continuous integration/continuous deployment (CI/CD) run. Other subnets/certificates may be stored as well. In embodiments, read/write access may be restricted to cloud platform teams. The configuration stored in this folder should be in sync with enterprise Configuration Management Database (CMDB). The variables from this configuration may replace the tokens defined in IaC when the CI/CD pipeline executes.

Application Infrastructure ("Layer-2"): Source Code for creating cloud services required by application teams for example: cloud-based products and services, including warehouses, databases, storage volumes, elastic load balancers, virtual machines, containers, serverless destinations, etc. For application cloud services to be instantiated, the base infrastructure (Layer-1) may have already been paved. For example, an elastic load balancer may require the subnets to be created, route tables to be modified, administration ports opened which are created in Layer-1. Application Teams may have read/write access on this repository and can trigger changes into target cloud environments.

Layer-2 may include a configuration folder that stores the configuration required by application IaC (e.g., certificate names, bucket Names, instance names, database schema users, etc.). The configuration variables may be replaced in IaC as part of a CI/CD build pipeline using standard token processes. The Layer-2 configuration may be a superset of enterprise CMDB. For example, bucket cross account access may require source bucket name, target role principal, etc.

In embodiments, Layer-1 and Layer-2 may be segregated to reflect the concerns between basic infrastructure setup and cloud services. For example, the Layer-1 workspace may implement foundational capabilities (e.g., networks, connectivity, private links, VPCs, subnets, etc.) that may be used by Layer-2 workspace to deploy application services. Cloud platform engineering may be responsible for Layer-1, and application teams may be responsible for Layer-2.

The Layer-1 and Layer-2 workspaces may be linked together loosely via configuration-as-code. Outputs from Layer-1 workspace may feed Layer-2. For example, for creating a relational database service, Layer-2 workspace may require a VPC, subnets and data subnets in different availability zones in, for example, a cloud provider. Layer-1 may create the VPC, subnets, etc. and may tag the subnets with web, application, and data.

Layer-2 workspaces may read the outputs from Layer-1 workspace and may create database-subnets and deploy a relational database service. References to Layer-1 workspace may be passed via configuration framework that reads the linkages from a CMDB. This provides flexibility if an application is distributed in more than one Layer-2 workspaces (app servers and databases), the linkages and order of execution may be managed from outside Infrastructure as Code tools.

IaC Modules: This code repository may host the reusable modules for cloud services. The modules wrap raw Infrastructure as Code tools for a cloud service and provide placeholders for key attributes, implement minimum controls that Enterprise policies require. The IaC modules may wrap key features, attributes in a reusable tag. Example modules may include: storage, storage buckets, storage policies, elastic load balancer with auto-scaling groups, etc.

Security Policy as Code: IaC executes within the context of security guardrails. A Security Policy as Code component provides the ability to enforce security policies before the infrastructure is deployed. The Security Policy as Code component's policies may inspect Infrastructure as Code tools plan stage, and can validate cloud resources and their attributes against established standards. In embodiments, storage buckets may not be public, and may use encryption using a customer managed key. Security Policy as Code serves as a "compile time" check for Infrastructure as Code executing within Layer-1 or Layer-2 workspaces.

Continuous delivery tool: A higher level CI/CD orchestrator may manage CI/CD pipeline and Infrastructure as Code tools in addition to rolling container-based deployments using standard strategies. The tool may watch artifact pipelines in CI/CD pipeline, trigger Infrastructure as Code tools deployments for standard resources (Layer-1 and Layer-2), build on Infrastructure as Code tools to additionally deploy containers, service mesh etc. Embodiments may watch CI/CD pipelines for completion and triggers Infrastructure as Code tools runs.

Continuous Integration tool. A continuous integration tool may compile an artifact and the higher-level CI/CD orchestrator may react to completion of the build by triggering an Infrastructure as Code tools run with appropriate configuration parameters. CI/CD pipeline is also designated to integrate with Secrets Management solutions for delivering artifacts to a wrapper for CI/CD as well as passing cloud provider keys for Infrastructure as Code tools to trigger infrastructure build outs.

IaC Abstraction tool. An IaC Execution Tool may host:

Workspaces, such as logical isolations for Layer-1 and Layer-2 across all applications. Each Layer-1 and Layer-2 code repository may be tied to their respective workspaces via a configuration (which may be stored in the metadata store). CI/CD pipeline may pull the code and may trigger the enterprises CMDB command line interface (CLI) with appropriate configuration parameters within each workspace. Workspaces may be tied to a code repository to maintain consistency between deployed environments and code base.

Security Policy as Code: Security policies may be stored in source control and may be pushed via CI/CD pipeline to Infrastructure as Code organizations and workspaces before every Terraform run automatically. Periodic pushes based on repository tagging and releases may also be performed. Policy sets may be constructed from basic policies, to be applied to each workspace. For example, Layer-1 workspace may have the permission to create VPCs, which may be restricted at Layer-2 workspaces via, for example, Security Policy as Code scripts. Security Policy as Code may also restrict deployment of any cloud services not approved yet for general usage.

Reusable Modules: Infrastructure as Code may host a private module registry that may host reusable modules that encapsulate common security controls and attributes. Modules may have different versions and may be inspected, for example, by Security Policy as Code scripts.

Configuration Framework: The configuration framework may read the parameters required by Layer-1 and Layer-2 runs, and maintain linkages between them through the IaC runs. The Layer-1 run may hand off VPC IDs, subnet IDs, etc. to Layer-2 runs. The hand-off between the two workspaces does not exist as a construct within IaC tools, but may be implemented using a home-grown config framework.

In one embodiment, Layer-1 is where base infrastructure components, such as Network, VLANs, Firewalls, etc. are provided. Layer-2 may be where the application teams can modify App Servers, data bases, etc. The configuration framework may connect Layer-1 and Layer-2.

The configuration framework may be implemented in a programming language that is supported by the CI tool. The configuration framework may read appropriate parameters from enterprise CMDB and may replace the variable tokens before enterprise CMDB runs.

User interface portal for end users that processes requests through various workflows, performs change management, ITSM etc. The user interface portal may store required parameters, audit, request logs, inventory of cloud resources (accounts and services within each account) to act as an input to CI/CD runs using IaC tools. For example, the reserved CIDR blocks for an account's VPC may be stored as a readable parameter within the enterprise CMDB.

Referring to FIG. 1, a system for deploying federated infrastructure as code is provided according to one embodiment. System 100 may include a plurality of pattern sources, such as operating system pattern source 110, platform pattern source 112, security pattern source 114, etc.

Examples of pattern or blueprint sources are described in U.S. Patent Application Ser. No. 63/087,431 and Ser. No. 17/494,817, the disclosure of each of which is hereby incorporated, by reference, in its entirety.

System 100 may further include electronic device 120, which may be any suitable electronic device (e.g., servers (physical and/or cloud-based), workstations, etc.), which may execute infrastructure seeding engine 122. infrastructure seeding engine 122 may access application pattern catalog 165.

Developer terminal 160 may provide a developer with access to infrastructure seeding engine 122 to specify patterns from application pattern catalog 165 for an IaC build.

Infrastructure seeding engine 122 may interface with metadata linking store 130, IaC tool 132, configuration store 134, credential store 136, security policies store 138, source code repository 140, and CI/CD pipeline 150.

Metadata linking store 130 may store metadata for application patterns. In embodiments, the metadata may store execution isolation, inheritance between execution isolations and scope of configuration parameters between isolation contexts. The metadata may also provide a context for discovering and maintaining infrastructure related to an application throughout operate lifecycle of the application. Examples may include legal entity restrictions, the size of the application, whether the application is a critical application, whether the application is an infrastructure application, login requirements/restrictions, security requirements, entity restrictions, keystore management requirements, credential management requirements, etc.

IaC tool 132 may execute the wrapper for IaC deployment.

Configuration store 134 may store configuration data for the application pattern. For example, the configuration may be based on metadata from, for example, execution isolations, application pattern requested, resources within an application pattern, a line of business, a type of application, a target deployment data center, number of isolations requested, environments requested, etc.

Credential store 136 may store credentials for components to authenticate to other components. Examples include application servers accessing databases or other systems, applications accessing other applications, applications accessing file stores, etc.

Security policies store 138 may store security policies that may be applied to application patterns. In one embodiment, security policy as code may be defined at the application pattern level by platform and security teams. The policies may be inherited by each instance and applied to execution scope based on the requested pattern and tech stack included. Security policy store 138 may store the order of execution for policy sets in the meta-data store and may refer back to the store for applying security at different execution scopes. As new policies are published within the organization for the application patterns, embodiments may keep the policy sets updated for each instance of the pattern in the organization.

Source code repository 140 may store source code for application patterns. The code may be inherited from application patterns published by platform teams. Access to the code may be restricted and may be based on access permissions for different execution scopes. For example, Layer-1 code may be setup to be modified by a shared services team whereas code may not be authorized for modification by application-development teams.

CI/CD pipeline 150 may facilitate deployment of the IaC. CI/CD pipeline 150 may be linked to an execution scope. Pipeline code may be generated and injected into the source code repositories for modification. The pipeline code may also have "hooks" for variables to be injected from the configuration store established in configuration generation. The deployment pipelines may also contain stages for executing security policies under different execution scopes.

Figure 2:
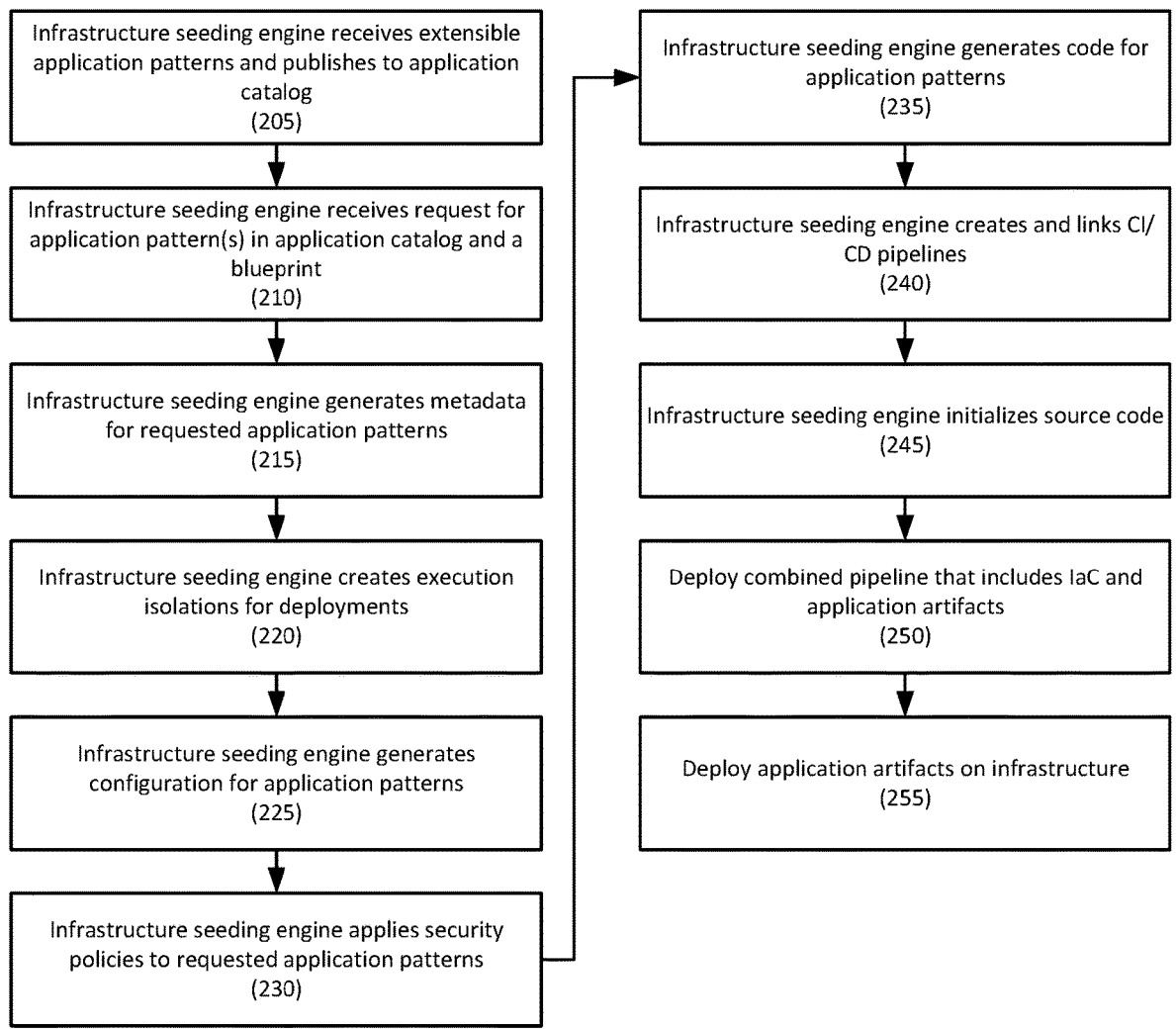
FIG. 2 depicts a method for deploying federated infrastructure as code according an embodiment.

Referring to FIG. 2, a method for deploying federated infrastructure as code is disclosed according to an embodiment.

In step 205, an infrastructure seeding engine may receive extensible application patterns from, for example, pattern sources (e.g., an operating system pattern source, a platform pattern source, a security pattern source, etc. and may publish the patterns to an application pattern catalog.

In one embodiment, the patterns may be assembled by platform teams in collaboration with security and shared services. Embodiments may initiate the code (e.g., run time code generation) into a source code repository, generate configuration (e.g., configuration code generation), create metadata linkages (e.g., meta-data generation and inheritance), link context sensitive telemetry (e.g., telemetry and monitoring linkages), apply security policy (e.g., security policies inheritance). Application teams may modify and extend the patterns as is necessary and/or desired.

In embodiments, developers may modify code within their execution isolation and create newer patterns to fit the needs of their applications. The newer patterns may be deployed into development and test environments to be validated before they emerge as new application patterns. Thus, development teams may contribute patterns back to the application catalog.

In step 210, the infrastructure seeding engine may receive a request for application pattern(s) in the application catalog and a blueprint for deployment a particular technology. For example, one or more application team may submit the request for the application pattern. The request may include a specific identification of the application pattern.

Optionally, once the request is received, an approval request may be submitted to an approver. The request may be due to, for example, data privacy concerns. The approver may approve or deny the request.

In step 215, the infrastructure seeding engine may generate metadata for the requested application patterns and/or the selected blueprint. Additional attributes, such as the selected business application, may also be considered. In embodiments, the metadata may store execution isolation, inheritance between execution isolations and scope of configuration parameters between isolation contexts. The metadata may also provide a context for discovering and maintaining infrastructure related to an application throughout operate lifecycle of the application. In one embodiment, the metadata store may be within Infrastructure Seeding engine In one embodiment, a metadata store may provide a foundation for governance and permissions related to an instance of application pattern. For example, the metadata store may provide an entitlements check with respect to the type of application, geo-location, legal jurisdiction and data classification checks.

In step 220, the infrastructure seeding engine may create execution isolations for deployments based on the metadata in the metadata store. The execution isolation may provide governance of configuration/code for deployments and separating concerns between platform teams and application teams. The isolation scope may also store the output from previous deployments and provide teams with re-usable components that may be used to separate recurring executions versus execute once and inherit. This forms the core concept of "Object Oriented Infrastructure" pattern defined and implemented embodiments. For example, the execution scope may be defined as Layer-1 Platform Infrastructure as Code and Layer-2 Application Team Code.

Layer-1 may provide core Infrastructure foundations supporting an application pattern or blueprint. Layer-1 is scoped to be modified by platform and shared support teams e.g., network tables, network routing, network isolations, subnets, VLANs, foundational firewall ports etc. This code executes first in every deployment and provides necessary output variables to Layer-2 execution isolation. Security policies at this isolation level are standardized across the enterprise and are different from the tech stack defined at Layer-2. Once established, the changes in this layer are few and more foundational to the working on the pattern.

Layer-2 may provide infrastructure code for the application layer that is instantiation from an application pattern or blueprint. This layer contains the tech stack, number of servers, disks, types of servers, software and connectivity between the application components. Layer-2 may "inherit" policies, output variables and refers to the execution isolation from Layer-1. It executes after Layer-1 isolation to inherit the above-mentioned properties. The application teams may modify the code in this layer for deployments. Separate security policy contexts may be applied at this layer to be more restrictive and generate required approval requests. The application teams may choose to establish as many Layer-2 isolations as the use case requires, and may define execution order for Layer-2 deployments. For example, application teams may define application servers and databases in two Layer-2 isolations, with database isolation executing before application isolation.

In step 225, the infrastructure seeding engine may generate a configuration for the application pattern. For example, configuration may be based on metadata from, for example, execution isolations, application pattern requested, resources within an application pattern, a line of business, a type of application, a target deployment data center, number of isolations requested, environments requested, etc.

In step 230, the infrastructure seeding engine may apply security policies to requested application patterns. In one embodiment, security policy as code may be defined at the application pattern level by platform and security teams. The policies may be inherited by each instance and applied to execution scope based on the requested pattern and tech stack included. Embodiments may store the order of execution for policy sets in the meta-data store and may refer back to the store for applying security at different execution scopes. As new policies are published within the organization for the application patterns, embodiments may keep the policy sets updated for each instance of the pattern in the organization.

In step 235, the infrastructure seeding engine may generate code for application patterns. For example, embodiments may generate code for the application pattern(s) requested by injecting any requested variations. The code may be inherited from application patterns published by platform teams. The application patterns may be governed, for example, by a platform team and a security policy team. Embodiments may generate the code, create a new project in a source code repository, store code in the source code repository, and set up access permissions for access by different execution scopes. For example, Layer-1 code may be setup to be modified by a shared services team whereas code may be authorized for modification by application-development teams.

In step 240, the infrastructure seeding engine may create and link CI/CD pipelines. For example, embodiments may create execution pipelines with CI/CD tools and link each pipeline or stages within a pipeline to an execution scope defined earlier. Pipeline code may be generated and injected into the source code repositories for modification. The pipeline code may also have "hooks" for variables to be injected from the configuration store established in configuration generation. The deployment pipelines may also contain stages for executing security policies under different execution scopes.

The deployments may be paused by the framework if they require additional IT service management (ITSM) approvals by end user, if they have security breaks reported in the infrastructure deployments., etc.

In step 245, the infrastructure seeding engine may initialize source code. In one embodiment, execution content and configuration information may be provided to the application teams in a portal, such as an IT SM/Configuration Store Portal.

Based on the risk profile of the application, costs involved, services portfolio available, etc. the ITSM approvals may be optionally generated for changes outside defined parameters. An approver may approve or deny the request.

Once the code is initialized and tied to a configuration store, in step 250, a combined pipeline that includes IaC and application artifacts may be deployed. For example, an application developer may fork the code, extend, and use the CI/CD pipelines to deploy a combined pipeline that includes the IaC as well as their application artifacts. The build pipeline may create/update infrastructure based on Layer-1 and Layer-2 code, validating the security policies in the process.

In step 255, the application artifacts may be deployed on the newly created/updated infrastructure to achieve an immutable infrastructure pattern.

Embodiments may provide some or all of the following:
An ecosystem for requesting, modifying and operating On-Prem and cloud infrastructure via application blueprints and patterns, that are governed under Enterprise compliance requirements, operate within enterprise security guardrails, are extensible by developer community and provides channels to crowd source new infrastructure patterns. The Federated infrastructure as code model provides jump-start infrastructure deployment patterns that are governed by platform and security policy teams. The framework provides channels for end-application teams to modify and contribute code back to the enterprise repository.

A framework that utilizes ITSM, continuous delivery/continuous integration, configuration management, secrets management, source code repositories, financial telemetry, and software defined infrastructure and application patterns to define and deploy infrastructure to on-prem and cloud data centers. The users of the system may be infrastructure engineers, software developers, managers, accounting departments and auditors. technical staff can request infrastructure patterns using general ITSM tools implementing workflows, which generates configuration and code for the Infrastructure at run time, registering the code with a source code repository and CI/CD tools pipelines, setup permissions, registering credentials with password managers, tagging infrastructure to accounting buckets, creating isolated execution contexts with Infrastructure as code tools, and finally executing the pipelines to deploy the infrastructure. The framework separates sensitive information such as credentials, network, routing etc. into a separate context that the end technical user does not have access to. This is achieved by simulating "inheritance" from object-oriented programming concepts. Each application pattern deployed is exposed to the developers to edit and re-deploy, but only for the permissioned isolation.

Governance Framework: The framework may define and implement enterprise governance across multiple tools for building and exposing components that may be at the core foundations of application patterns and blueprints that is supported by infrastructure as code. Operating system, container images and pre-baked software components may be automatically built, patched and security scanned before they become a part of a pattern exposed. Security policies may be defined with different scopes (app scope, pattern scope, business unit scope, data-center scope and enterprise scope) and applied to deployments. Software licensing and financial telemetry may provide a continuous monitoring view against budgeted numbers for a deployment.

Monitoring agents may be embedded into each pattern component with a context of what to monitor as it varies across application patterns.

Embodiments may link the deployments to operations monitoring which may be context driven based on the application patterns requested. The patterns may define hooks and guidance for framework to plug in appropriate monitoring agents and initialize the agents or probes applicable for the scenarios and recovery time objective (RTO) scenarios. The framework may also link the infrastructure accounts to financial monitoring and runs usage against a budget. Overruns may trigger approval using the ITSM process where application and/or financial owners can review and evaluate the budgets against a deployment.

Embodiments may orchestrate and audit execution of infrastructure as code across multiple tools that specialize in a particular area, but neither tool provides the complete end to end capability of deploying infrastructure against governed patterns, within established guardrails and capturing audit at each stage for reporting and ITSM lifecycle purposes.

Embodiments may facilitate the app-dev teams to modify/extend code for infrastructure deployments which executes within the deployment pipelines—create and link deployment pipelines. security compliance issues, financial overruns, cross deployment access (e.g., sharing data with or from a different application context), out of turn deployments or deviating from prescribed application patterns trigger ITSM approvals to be reviewed and evaluated by application owners, security managers and financial owners. The deployment pipelines may be paused until workflows are completed and only can only proceed when the workflow is approved. The pipeline execution is cancelled when a workflow request is rejected.

Embodiments may initiate, orchestrate and operate infrastructure as code deployments across multiple tools while maintaining the required meta- data, linkages between industry standard tools that do not communicate with each other in isolated use cases. Embodiments may also prescribe a governance structure and security guardrails for individual tools that may be implemented using techniques derived from other areas in software engineering constructs, but not necessarily used by commercial tools in end-to-end deployments of Infrastructure (e.g., inheritance pattern, isolation pattern, meta-data linkage pattern, security scope pattern, event pattern for deployment pipelines etc.). The application of these abstract constructs are unique. Embodiments may also capture feedback, output codes, return values from each of the tools to converge data and manage Infrastructure deployment lifecycles.

Embodiments may define the basic principles and concerns of exposing an application pattern in an enterprise. Each of the concerns fulfils a compliance, security or functional requirement for deploying and managing applications at scale. The concerns separated by individual tools that implement the construct, but merged together as a cohesive deployment using the framework.

Embodiment may provide federated infrastructure as code. Embodiments may separate the concerns across creators, validators, extenders, and contributors. Creators create and expose application patterns and their underlying infrastructure definitions to an application catalog. The patterns often consist of re-usable components that may be defined using a standardized methodology. Validators may write compliance checks as code, establish security guardrails as code and provide validation routines for an application and its infrastructure. The validators may scope their policies as code for Layer-1, Layer-2, Global, and Application Local scopes. Extenders may include application development teams that request patterns and operate on the infrastructure code within their instantiated source code repositories. The teams can modify the patterns to suit the needs of their application. The extending is limited to the scope and parameters defined within the pattern itself and the security policies that it refers to. Contributors may include technical staff, security experts or shared services that create new patterns from scratch or by modifying existing ones based on the use cases of their applications. The contributors can propose new patterns to a governance council, and approved patterns may be then operationalized and introduced back into the application catalog.

To the extent that names for commercial products have been used herein, it should be recognized that this is exemplary only and does not limit the scope of this disclosure. Any product that provides similar functionality may be used as is necessary and/or desired.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A computer-implemented method for deploying federated infrastructure as code, comprising:
   receiving, by an infrastructure seeding engine executed by a computer processor, a plurality of extensible application patterns;
   publishing, by the infrastructure seeding engine, the plurality of extensible application patterns to an application pattern catalog;
   receiving, by the infrastructure seeding engine, an instantiate request comprising a selection of one of the plurality of extensible application patterns and a blueprint, wherein the blueprint identifies a deployment technology;
   generating, by the infrastructure seeding engine, metadata for the selected extensible application pattern and the blueprint;
   creating, by the infrastructure seeding engine, execution isolations for deployments based on the metadata, wherein the execution isolations comprise a Layer-1 execution scope that identifies network tables, network routing, network isolations, subnets, VLANs, and/or foundational firewall ports for the selected extensible application pattern and a Layer-2 execution scope that comprises infrastructure code the selected extensible application pattern and/or the blueprint;
   generating, by the infrastructure seeding engine, a configuration for the selected extensible application pattern based on the execution isolations;
   generating, by the infrastructure seeding engine, source code for the selected extensible application pattern based on the configuration for the selected extensible application pattern;
   creating and linking, by the infrastructure seeding engine, the source code for the selected extensible application pattern to a continuous integration/continuous deployment pipeline, wherein the continuous integration/continuous deployment pipeline comprises stages for executing security policies for the selected extensible application pattern;
   initializing, by the infrastructure seeding engine, the source code; and
   deploying, by the infrastructure seeding engine and using the continuous integration/continuous deployment pipeline, the source code and application artifacts, wherein the deployment achieves an immutable infrastructure.

2. The computer-implemented method of claim 1, wherein the extensible application patterns comprise an operating system extensible application pattern, and/or a platform extensible application pattern.

3. The computer-implemented method of claim 1, wherein the metadata comprises execution isolation, inheritance between execution isolations, and/or scope of configuration parameters between isolation contexts.

4. The computer-implemented method of claim 1, wherein the metadata identifies a type of application, a geo-location for the application and/or the blueprint, a legal jurisdiction for the application and/or the blueprint, or a data classification check for the application.

5. The computer-implemented method of claim 1, wherein the code for the selected extensible application pattern is inherited from the published extensible application pattern.

6. The computer-implemented method of claim 1, further comprising:
   receiving, by the infrastructure seeding engine, approval for the selected extensible application pattern.

7. An electronic device, comprising:
   a memory storing an infrastructure seeding engine; and
   a computer processor;

wherein, when executed by the computer processor, the infrastructure seeding engine causes the computer processor to:

receive a plurality of extensible application patterns;

publish the plurality of extensible application patterns to an application pattern catalog;

receive an instantiate request comprising a selection of one of the plurality of extensible application patterns and a blueprint, wherein the blueprint identifies a deployment technology;

generate metadata for the selected extensible application pattern and the blueprint;

create execution isolations for deployments based on the metadata, wherein the execution isolations comprise a Layer-1 execution scope that identifies network tables, network routing, network isolations, subnets, VLANs, and/or foundational firewall ports for the selected extensible application pattern and a Layer-2 execution scope that comprises infrastructure code the selected extensible application pattern and/or the blueprint;

generate a configuration for the selected extensible application pattern based on the execution isolations;

generate source code for the selected extensible application pattern based on the configuration for the selected extensible application pattern;

create and link the source code for the selected extensible application pattern to a continuous integration/continuous deployment pipeline, wherein the continuous integration/continuous deployment pipeline comprises stages for executing security policies for the selected extensible application pattern;

initialize the source code; and deploy, using the continuous integration/continuous deployment pipeline, the source code and application artifacts, wherein the deployment achieves an immutable infrastructure.

8. The electronic device of claim 7, wherein the extensible application patterns comprise an operating system extensible application pattern, and/or a platform extensible application pattern.

9. The electronic device of claim 7, wherein the metadata comprises execution isolation, inheritance between execution isolations, and/or scope of configuration parameters between isolation contexts.

10. The electronic device of claim 7, wherein the metadata identifies a type of application, a geo-location for the application and/or the blueprint, a legal jurisdiction for the application and/or the blueprint, or a data classification check for the application.

11. The electronic device of claim 7, wherein the code for the selected extensible application pattern is inherited from the published extensible application pattern.

12. The electronic device of claim 7, wherein the infrastructure seeding engine further causes the computer processor to receive approval for the selected extensible application pattern.

13. A system comprising:

a database storing a plurality of extensible application patterns;

an application pattern catalog storing the plurality of extensible application patterns;

a metadata linking store that stores metadata;

a configuration store that stores configuration data;

a security policy store that stores security policies applicable to the plurality of extensible application patterns;

a source code repository that stores source code; and an electronic device comprising a computer processor and a memory storing an infrastructure seeding engine that, when executed by the computer processor, the infrastructure seeding engine causes the computer processor to:

receive a selection of one of the plurality of extensible application patterns and a blueprint, wherein the blueprint identifies a deployment technology;

generate metadata for the selected extensible application pattern and the blueprint and store the metadata in the metadata store;

create execution isolations for deployments based on the metadata, wherein the execution isolations comprise a Layer-1 execution scope that identifies network tables, network routing, network isolations, subnets, VLANs, and/or foundational firewall ports for the selected extensible application pattern and a Layer-2 execution scope that comprises infrastructure code the selected extensible application pattern and/or the blueprint;

apply security policies to the selected extensible application pattern from the security policy store;

generate a configuration for the selected extensible application pattern based on the execution isolations;

generate source code for the selected extensible application pattern based on the configuration for the selected extensible application pattern and store the source code in the source code repository;

create and link the source code for the selected extensible application pattern to a continuous integration/continuous deployment pipeline, wherein the continuous integration/continuous deployment pipeline comprises stages for executing security policies for the selected extensible application pattern;

initialize the source code; and deploy using the continuous integration/continuous deployment pipeline, the source code and application artifacts, wherein the deployment achieves an immutable infrastructure.

* * * * *